J. Trunick.
Saw Guide.
N° 98,127. Patented Dec. 21, 1869.
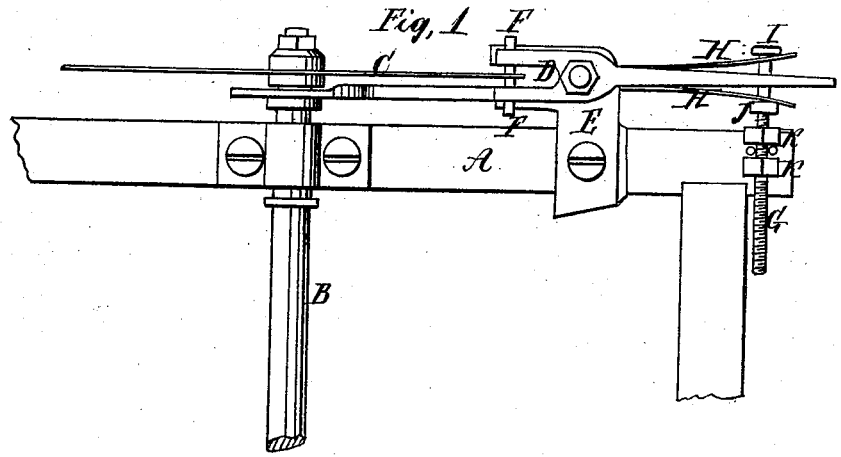
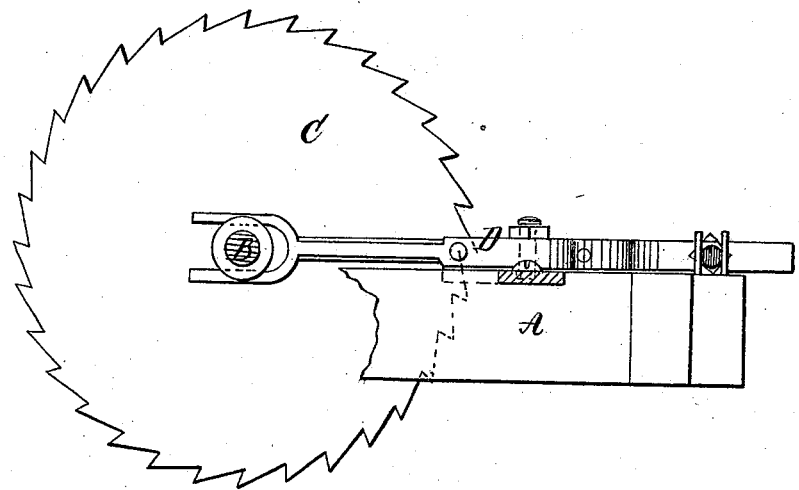
Witnesses,
Alex F. Roberts
Jno. F. Brooks
Inventor,
J. Trunick
PER Munn & Co
Attorneys.

United States Patent Office.

JOHN TRUNICK, OF MUSCATINE, IOWA.

Letters Patent No. 98,127, dated December 21, 1869.

IMPROVEMENT IN CIRCULAR-SAW MILLS.

The Schedule referred to in these Letters Patent and making part of the same.

*To all whom it may concern:*

Be it known that I, JOHN TRUNICK, of Muscatine, in the county of Muscatine, and State of Iowa, have invented a new and useful Improvement in Saw-Guides; and I do hereby declare that the following is a full, clear, and exact description thereof, which will enable others skilled in the art to make and use the same, reference being had to the accompanying drawings, forming part of this specification.

This invention relates to an improvement in means for guiding circular saws, and keeping them to the true saw-line, and consists in a certain construction and arrangement of parts, as hereinafter more fully described.

In the accompanying drawings—

Figure 1 represents a top or plan view.

Figure 2 is a side view.

Similar letters of reference indicate corresponding parts.

A is the saw-frame.

B is the saw-arbor, or shaft.

C represents the saw.

D represents the saw-guide.

The guide is connected with the frame, by means of the plate E, to which plate the guide is pivoted, so that it may oscillate or vibrate laterally, as on a centre. The guide is forked near its centre, and the cutting-edge of the saw runs in the fork.

F F are guide-pins, of wood, or any suitable material, which pass through orifices in the guide, as seen, and come in contact, or nearly in contact, with the saw, so as to hold the saw to the true line, but in such a manner that the saw is allowed to give somewhat, laterally, in either direction, when diverted by the grain of the wood, by knots, or from any other cause.

The guide extends to the saw-arbor, where its end is forked, and confined in a groove in a collar on the arbor, as seen in the drawing.

The arbor is allowed longitudinal play in its bearing.

Forward of the saw, the guide extends to the ad-adjusting-screw G. The screw passes through it, as seen.

H H are two springs, attached to the guide, and extend forward, and are brought in contact with the head of the screw I, and with a collar, J, on the screw.

The screw G is adjusted on the frame, by means of the nuts K K, which work on opposite sides of fixed studs, as seen in the drawing.

From this arrangement, it will be seen that when the saw is varied (from any cause) from the true saw-line, it will be brought back again to its true position by means of the springs H H, operating upon the guides.

While the cutting-point of the saw is allowed a certain degree of flexibility, it is, by this arrangement, brought back to the true saw-line, so that marketable lumber is produced, when, by the ordinary rigid arbor and guide, it would be spoiled.

Having thus described my invention,

I claim as new, and desire to secure by Letters Patent—

The forked guide D, springs H, and screw-guide G, provided with collar and screw-nuts, combined and arranged with the saw C and arbor B, as shown and described, and for the purpose specified.

The above specification of my invention signed by me, this     day of          , 1869.

JOHN TRUNICK.

Witnesses:
MILO A. PRUDEN,
WILL. MUNDY.